UNITED STATES PATENT OFFICE.

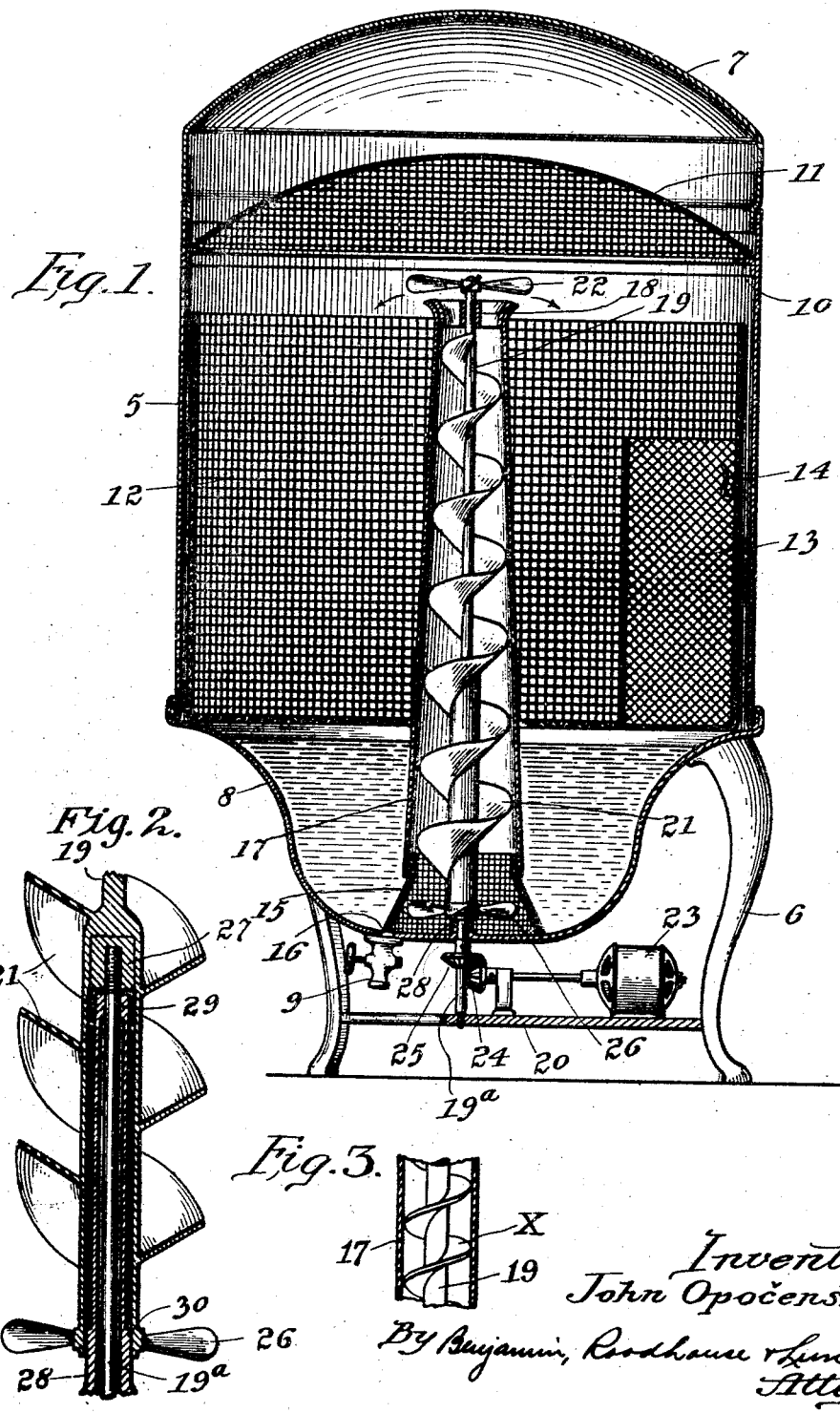

JOHN OPOČENSKÝ, OF CHICAGO, ILLINOIS.

DISH-WASHER.

1,382,117. Specification of Letters Patent. Patented June 21, 1921.

Application filed June 4, 1920. Serial No. 386,553.

*To all whom it may concern:*

Be it known that I, JOHN OPOČENSKÝ, a subject of Russia, and a citizen of Ukraine, residing at Chicago, in the county of Cook and State of Illinois, have invented a new and useful Improvement in Dish-Washers, of which the following is a specification.

My present invention relates to improvements in dish washing apparatus, and more particularly to a design of apparatus which may be made in small as well as large sizes which will render it practicable for use in small families as well as in large establishments such as hotels, lunchrooms, etc. I have made provisions for different compartments for the respective reception of plates and dishes to which generally adhere most tenaciously particles of food and grease, and for cups, glasses and other articles to which the grease does not usually adhere to such an extent as upon the dishes and plates. These respective compartments have been arranged one above the other so as to realize most completely the cleansing action of the hot water and emollient employed, and this arrangement also facilitates the rinsing and draining of the articles after they have been subjected to the action of the soap and water.

Among the objects of my invention are the provision of a dish washing apparatus wherein simple and effective means are provided for an effective distribution of the hot water, suds and rinsing water throughout the washing and rinsing compartment so that all the articles contained in the apparatus are thoroughly cleansed. I have also arranged the elements of my apparatus so that after the initial washing or rinsing has been completed and the grease and particles of food have been removed from the articles being washed, these food particles and grease may be removed from the washing compartment and hot water and suds placed in the apparatus for a complete washing and rinsing of the articles. Further objects of my invention are the provision of a dish washer that is compact and neat in appearance, durable in construction, dependable in operation, and which may be manufactured economically so that it may be sold to the user at a comparatively moderate price.

I prefer to accomplish all the divers objects of my invention in substantially the manner hereinafter fully set forth, and as more particularly pointed out in the appended claims, reference being now had to the accompanying drawings that form a part of this specification, in which—

Figure 1 is a central vertical section of the apparatus embodying my invention.

Fig. 2 is a detail in section and enlarged of the water circulating device.

Fig. 3 is a fragmentary section showing a modified screw mechanism for elevating the water.

In the drawings, similar reference characters are employed to designate the same parts throughout the views, and by referring to Fig. 1 it will be seen my improved dish washing apparatus comprises a cylindrical shell 5 supported preferably upon legs or standards 6 and provided with a substantially dome-shaped cover 7 to close the open upper portion of shell 5. I have shown the bottom 8 of an inverted substantially dome-shape or somewhat conical, but this is not essential as this bottom may be hopper-shaped, or V-shaped or an inverted pyramid, if desired, or it may be a flat longitudinal plate, and the shell I prefer to make round, although it may be angular in cross-section, if convenient. However, I have found it desirable to have the bottom of the apparatus shaped so as to facilitate the gravitation of the food particles and refuse to the discharge or drain-out cock 9 in the bottom 8 in order that they may be readily removed therefrom.

An internal annular flange 10, preferably of angle-metal is provided in the upper portion of the shell and slightly below the upper edge of shell 5 to provide a seat or shelf upon which the outer edges of a reticulated tray 11 is supported. This tray may be made of perforated metal, wire or metal screen, or other suitable material, and is preferably concave-convex in cross-section, as seen in Fig. 1, so that cups, drinking-glasses, tumblers and similar ware may be placed thereon in an inverted position to receive the water and suds both internally and externally. A relatively deep basket 12 of reticulated metal is positioned in the container or shell 5 with its bottom resting upon or supported by the adjacent peripheral portions of bottom 8 of the apparatus. This basket 12 has cylindrical sides and a substantially flat bottom connecting the lower edges of said sides and is adapted to receive dishes and like table ware, and a small basket 13 also of reticulated metal for knives, forks and like ware is supported within the basket 12 by means of a hook 14 that is inserted through the interstices or reticulations of the side wall of basket 12, as will be understood.

Mounted centrally of bottom 8 is a substantially conical shaped sieve 15, the base whereof is horizontally disposed upon the lowermost portion of bottom 8, and a portion of the outer edge of the conical wall of this sieve extends axially or centrally over the drain outlet 16 leading to the drain-cock 9, the purpose whereof will hereinafter more fully appear. A tapered tube 17 has its lower end secured to and supported by the sieve and extends upwardly substantially the height of shell 5, and is axially disposed with respect thereto. This tube is for conducting the cleansing fluid to a point above the dishes in the basket 12 and terminates in close proximity to the under side of tray 11, and its upper discharge end is flared outwardly to facilitate the distribution of the cleansing fluid. A spider 18 is mounted transversely across the discharge end of tube 17 with a central journal or bearing for the upper end of a shaft or rod 19, the lower end whereof is journaled in suitable bearings in the bottom member 8 of the apparatus through which it extends to a transverse supporting frame 20 extending between legs or standards 6. Carried by and secured to this shaft 19 is a modified Archimedes screw 21 the blade or fin whereof is inclined to the axis of tube 17 and decreases in width toward the top, as seen in Fig. 1 of the drawings, to fit the tapered interior of said tube. However, the blade may be extended straight out from the axis at right-angles and secured to the tube as in a true Archimedes screw. By constructing this tube and screw in the manner described, and with the taper referred to, the elevation of the cleansing fluid is greatly facilitated and it is driven upwardly with sufficient force to be scattered by the blades of a distributer or fan 22 mounted upon the extended upper end of the rod or shaft 19.

Any means may be provided for actuating shaft 19, and for this purpose in the drawings I have shown a suitable electric motor 23 that is mounted upon cross-frame 20 and carries a gear 24 upon the end of its spindle that meshes with and drives shaft 19 through the medium of a gear 25 fast upon the adjacent portion of shaft 19.

The operation of my apparatus is as follows: After the dishes and other articles have been placed in their respective baskets and trays, hot water and soap-suds are poured into the receptacle in a desired quantity, or preferably just below the upper edge of bottom 8 and the cover closed. The motor is then started to drive the shaft. This elevates the water and suds in tube 17 with considerable speed and the blades of the distributer or fan 22 break up the stream of water and splash it upwardly into and above the glasses and cups in tray 11, as well as scatter the water and suds over the dishes and other ware in the baskets 12 and 13. The water and suds return to bottom 8 and are again elevated by the screw and the operation continued until the dishes, etc., have been cleansed, and it will be understood that strainer 15 will prevent the particles of food and other refuse washed from the articles being elevated again by the screw. Whenever it is desired, cock 9 may be opened for a short time to draw off the food particles and refuse, and when it is desired to clean off the sieve the rotation of the screw may be reversed by simply reversing the motor which forces the water outwardly through the sieve and the whole interior may be drained of water and refuse. If desired, a small propeller 26 may be mounted upon shaft 19 below the screw to assist both in clearing the sieve of food particles when the shaft is reversed and for agitating the water within the sieve prior to its being elevated which, of course, will have a tendency to force some of the water through the sieve outwardly, and thus clear its interstices during the operation of the apparatus.

The lower portion of shaft 19 is enlarged and made hollow or cylindrical, as seen in Fig. 2, so that the upper end of the hollow portion is above the water level in the receptacle. A block 27 is fitted into the upper end of the hollow portion into which is screwed extension 19a of the shaft that passes out of the lower end of the hollow portion and through the receptacle to its supporting bearing on cross-piece 20. A tubular post 28 rises from the receptacle bottom 8 and surrounds extension 19a in such manner that it is telescoped by the hollow portion of shaft 19, and upper and lower bearings 29 and 30 are provided on post 28 to journal respectively the upper end of extension 19a and the lower end of the hollow portion of shaft 19. This structure prevents water flowing out of the bearing for shaft 19, or its extension 19a because of the fact that the tubular post 28 is practically integral with or is formed as a part of the bottom shell 8 of the receptacle, and the top of post 28 being above the water level keeps the upper bearing free and prevents seepage.

It will be understood that modifications of the specific structure herein shown may be made without materially departing from the principles involved. For example, the electric motor may be dispensed with and the shaft and screw actuated manually by a fly-wheel, belt and pulleys. Therefore, I desire it understood that obvious changes and substitutions may be made without evading the scope of the appended claims.

What I claim is:—

1. A dish washer comprising a suitable closed receptacle, a tapered tube positioned axially in said receptacle and terminating below the top thereof, a screen element forming the lower portion of the wall of said tube, propeller blades within said screen element, a shaft extending from said blades axially through said tube, a continuous helical flange on said shaft from a point adjacent said blades to one adjacent the top of said tube, rotatable blades above the discharge end of said tube, and means for actuating said shaft.

2. A dish washer comprising a suitable closed receptacle, a tapered tube positioned axially in said receptacle and terminating below the top thereof, a screen element forming the lower portion of the wall of said tube, propeller blades within said screen element, a shaft extending from said blades axially through said tube, a continuous helical flange on said shaft from a point adjacent said blades to one adjacent the top of said tube; said flange being inclined with respect to said shaft and decreasing in width toward its upper end to approximate the interior taper of said tube, rotatable blades above the discharge end of said tube, and means for actuating said shaft.

3. A dish washer comprising a suitable closed receptacle, a tube positioned axially within said receptacle, a screen element forming the lower portion of the wall of said tube, propeller blades within said screen element, a shaft extending from said blades through said tube, a helical flange on said shaft from a point adjacent said blades to one adjacent the top of said tube, rotatable blades above the discharge end of said tube, means for actuating said shaft, and suitable structures within said receptacle to receive the articles to be washed.

Signed at Chicago, county of Cook, and State of Illinois, this 15th day of May, 1920.

JOHN OPOČENSKÝ.

Witness:
E. K. LUNDY, Jr.